Patented Sept. 18, 1945

2,384,935

UNITED STATES PATENT OFFICE 2,384,935

CONDENSATION PRODUCTS AND METHODS OF PREPARING AND USING THE SAME

Eugene Lieber, Staten Island, N. Y., assignor to Standard Oil Development Company, a corporation of Delaware No Drawing. Application November 22, 1940, Serial No. 366,707

7 Claims. (Cl. 260—592)

This invention relates to a novel type of chemical condensation products and to methods of preparing such products and using them for various purposes, more particularly as pour depressors in waxy lubricating oils.

Broadly, this invention comprises the production of a novel type of condensation product by reacting an aliphatic aromatic ketone with a resinifying agent, especially in order to produce an oil-soluble condensation product.

The aliphatic aromatic ketone to be used is preferably one having the general formula RCOAr, in which R represents an aliphatic group and Ar is an aromatic group. The group R is preferably an aliphatic hydrocarbon group and preferably contains more than 10 carbon atoms. Also, although some slightly unsaturated aliphatic groups can be used, such as the group attached to the carbonyl radical in the oleyl group obtained from oleic acid, it is preferred to use saturated (i. e., alkyl) groups, such as the heptadecyl group, attached to the carbonyl radical in the stearyl group obtained from stearic acid, or the corresponding cetyl and octadecyl groups as well as mixed groups, such as those obtained from paraffin wax oxidation acids. The group Ar may represent benzene, naphthalene, anthracene, phenanthrene, diphenyl, toluene, xylene, phenol, alpha- or beta-naphthol, cresol, aniline, alpha-naphthylamine, tertiary-amyl phenol, etc. Also, if desired, various other derivatives of such ketones may be used. The aliphatic group R may also contain various substituents, e. g., hydroxy, methyl, ethyl, chloro, amino, and the like.

Although the preparation of such ketones does not constitute part of the present invention, it may be explained that they may be suitably prepared by condensing fatty acid chlorides, e. g., stearyl chloride, with a suitable aromatic compound, e. g., benzene, naphthalene, or mixed aromatic compounds, such as those obtained from coal-tar fractions; this condensation is usually carried out by means of a Friedel-Craft catalyst. During the preparation of such ketones, some substances having what may be termed a "compound-ketone structure" such as those having the general formula RCOArCOR, are sometimes formed and may be used along with the main ketone product.

The other reactant to be used according to this invention is a resinifying or interlinking agent which is instrumental in coupling together successive molecules of the aliphatic aromatic ketone until chains of sufficient length are built up to produce high molecular weight condensation products having wax-modifying properties. This interlinking agent is preferably a carbonyl-group-containing organic compound and is preferably selected from the class consisting of aldehydes and ketones of a sufficiently low molecular weight to effect the desired interlinking action. Examples of materials of this class include formaldehyde, acetaldehyde, propionaldehyde, butyraldehyde, acetone, methyl ethyl acetone, ispropyl ketone, etc. These compounds should in general have no more than 10 carbon atoms, and preferably no more than 4 carbon atoms. They may be represented by the general formula R'COX, where X is hydrogen or R' (either the same or different), and R' may also be hydrogen (formaldehyde).

The primary chemical reaction involved in the present invention is probably expressed by the following chemical equation:

2RCOAr+R'COX=
RCOAr(R')C(X)ArCOR+H₂O

This reaction is probably accompanied or followed by other substantially similar reactions, in which the product of the first reaction is interlinked with additional molecules of the aliphatic aromatic ketone with the resultant formation of higher molecular condensation products which may be considered to have a linear-chain type structure. One graphic representation of such a product is as follows:

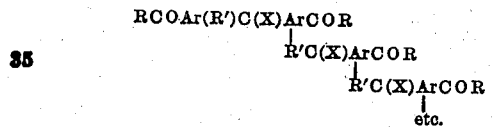

Thus the high molecular weight condensation products may be considered to have the general formula RCOAr[(R')C(X)ArCOR]ₙ, where n is a subscript indicating the number of monomeric units condensed together or, in other words, the degree of condensation, and the other letters have the meanings indicated above.

To effect the condensation, it is preferred to use a condensation catalyst, preferably a dehydrating agent, such as sulfuric acid, zinc chloride, boron trifluoride, stannic and/or stannous chloride, zinc oxide, phosphoric acid, phosphorus pentoxide, ferric chloride, etc. If sulfuric acid is used, it is often desirable, although not necessary, to use some glacial acetic acid as a solvent or promoter; it acts as a dehydrating solvent and is not a catalyst for the reaction by itself.

The proportions in which the reactants should be used are preferably ½ to 5, or preferably 1 to 3, mols of interlinking agent to one mol of the aliphatic aromatic ketone. The amount of condensing agent may vary to a large extent, depending partly upon the nature and amount of reactants as well as primarily upon the temperature and the desired reaction time, but usually it should be about ⅕ to 5 mols to one mol of the high molecular weight aliphatic aromatic ketone. If glacial acetic acid is used, the amount should be between the approximate limits of 50% and 500% by weight based on the aliphatic aromatic ketone.

In carrying out the invention, the reaction temperature should be maintained between the approximate limits of 100° and 300° F., preferably 150° to 250 F., and the reaction time, which obviously varies inversely with the temperature should be about ½ to 10 hours, or usually about 1 to 5 hours.

When the reaction has been completed it is generally desirable to cool the reaction mixture and dilute it, both steps being accomplished by adding a substantial volume of water. Then the reaction mixture is extracted with a refined kerosene, and afterwards settled; the kerosene layer is washed with water until free of acid and finally distilled under vacuum or with fire and steam to about 600 F., in order to remove the solvent and low boiling products.

The distillation residue is the desired high molecular weight condensation product. It is soluble in mineral lubricating oils and is substantially non-volatile at about 600° F. In most cases it is a viscous oil and has a color usually ranging from red to brown, although sometimes it has more of a green color.

The product of this invention has the property of modifying the crystal structure of waxes, such as paraffin wax, when added to compositions containing the same. For instance, when about .05–10.0%, preferably 0.2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oils. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc. or for making various molded products.

For the sake of illustration but without desiring to limit the invention to the particular materials used, some experimental data are given. In carrying out these tests the general procedure described hereinbefore was used. In making the pour-point test a small amount of the condensation product was dissolved in a mineral lubricating oil base stock having a pour point of +30° F., the pour point of the resulting blends being shown in the table.

*Table*

| Test No. | Mixed ketone | | Aldehyde | | Catalyst | | Temp. | Time | Condensation product | | | |
|---|---|---|---|---|---|---|---|---|---|---|---|---|
| | | | | | | | | | Yield | Pour points (° F.) of blends made with addition of— | | |
| | Name | Gms. | Name | Gms. | Name | Gms. | ° F. | Hours | | 1.0% | 2.0% | 5.0% |
| 1 | Stearyl benzene | 105 | Form- | 27 | $H_2SO_4$[1] | 100 | 150 | 3 | 106 | +30 | | +30 |
| 2 | do | 105 | do | 27 | do | 100 | 150 | 1 | 106 | 0 | −15 | |
| 3 | do | 105 | do | 9 | do | 25 | 150 | 1 | 80 | | −15 | |
| 4 | do | 105 | do | 9 | do | 50 | 150 | 1 | 79 | | +10 | |
| 5 | do | 105 | do | 9 | do | 100 | 150 | 1 | 99 | | 0 | |
| 6 | do | 105 | do | 9 | do | 100 | 200 | 1 | 100 | | −5 | |
| 7 | do | 105 | do | 9 | | | | | | 0 | −10 | |
| 8 | Stearyl naphthalene | 120 | Form- | 9 | $H_2SO_4$[1] | 100 | 200 | 1 | 117 | +30 | | +30 |
| 9 | do | 120 | do | 20 | do | | | | | | | 0 |
| 10 | do | 250 | | | ZnCl$_2$ | 50 | 175 | 2 | 242 | | | −10 |
| 11 | Wax-naphthalene [2] | 120 | Form- | 14 | $H_2SO_4$[1] | 200 | 175 | 1½ | 111 | +30 | +20 | +15 |
| 12 | do | 120 | Butyr- | 24 | do | 100 | 150 | 1 | 122 | | −10 | −20 |
| 13 | do | 240 | do | 48 | ZnCl$_2$ | 48 | 175 | 2 | 246 | | | −10 |
| 14 | do | | | | | | | | | | | −25 |
| 15 | Wax-benzene [2] | 105 | Form- | 14 | $H_2SO_4$[1] | 200 | 175 | 1½ | 95 | | +5 | +5 |
| 16 | do | 105 | Butyr- | 24 | do | 100 | 150 | 1 | 110 | | −10 | −10 |
| 17 | do | 210 | do | 48 | ZnCl$_2$ | 42 | 175 | 3 | 197 | | −10 | |
| 18 | do | | | | | | | | | | −5 | −10 |
| 19 | Stearyl phenol | | Form- | | $H_2SO_4$[1] | | | | | +30 | +10 | +15 |
| 20 | do | 83 | do | 7 | do | 77 | 150 | 1 | 71 | −15 | −30 | |
| 21 | do | 216 | do | 18 | ZnCl$_2$ | 44 | 175 | 3 | 183 | −15 | −15 | |

NOTES.—Test Nos. 1, 8, 11, 15 and 19 are control experiments. Form- means formaldehyde, which is used in the form of trioxy methylene. Butyr- means butyraldehyde.
[1] 200 cc. of glacial acetic acid were also used.
[2] Made from wax acids obtained by oxidation of paraffin wax. The acids used in these experiments had an average molecular weight about equal to that of stearic acid.

It is seen in the above table that small additions of 1, 2 or 5% of the high molecular weight condensation products of this invention, effected a substantial reduction in the pour point of waxy mineral lubricating oil having an original pour point of 30° F.; in some instances (tests Nos. 20 and 21) an addition of only 1% of pour depressor reduced the pour point to as low as −15° F., thus indicating that very potent pour depressors can be made from raw materials which have only weak, if any, pour-depressing effects.

It is not intended that this invention be limited to any of the specific examples which were given merely for the sake of illustration nor to any theory as to the mechanism of the operation of the invention but only by the appended claims in which it is intended to claim all novelty inherent in the invention as broadly as the prior art permits.

I claim:

1. The process which comprises reacting an alkyl aryl ketone with a low molecular weight carbonyl group-containing interlinking agent compound selected from the group consisting of aldehydes and ketones containing less than 10 carbon atoms, with the assistance of a dehydrating catalyst at a temperature of about 100° to 300° F. and subjecting the reaction mixture to fire and steam distillation up to about 600° F. to obtain the desired condensation as distillation residue.

2. The process which comprises reacting one mol of alkyl aryl ketone with ½ to 5 mols of low molecular weight aldehyde having less than 10 carbon atoms, in the presence of a dehydrating condensation catalyst, and subjecting the reaction mixture to fire and steam distillation up to about 600° F. to obtain the desired condensation product as distillation residue.

3. The process which comprises reacting stearyl benzene with formaldehyde and subjecting the reaction mixture to distillation up to about 600° F. under reduced pressure to obtain the desired high molecular weight condensation product as distillation residue.

4. The process which comprises reacting stearyl phenol with formaldehyde in the presence of a dehydrating condensation catalyst at a temperature of about 100° F. to 300° F., and subjecting the reaction mixture to fire and steam distillation up to about 600° F. to obtain the desired high molecular weight oil-soluble condensation product as distillation residue.

5. The process according to claim 4 carried out in the presence of sulfuric acid and glacial acetic acid.

6. The process which comprises reacting a ketone having the general formula RCOAr, where R is an aliphatic group having more than 10 carbon atoms and Ar is an aromatic group, with a low molecular weight aliphatic interlinking agent containing a carbonyl group and selected from the group consisting of aldehydes and ketones containing less than 10 carbon atoms, and subjecting the reaction mixture to distillation up to 600° F. under reduced pressure to obtain the desired condensation product as distillation residue.

7. A high molecular weight oil-soluble condensation product which has been obtained by reacting an alkyl aryl ketone with a low molecular weight carbonyl group-containing interlinking agent compound selected from the group consisting of aldehydes and ketones containing less than 10 carbon atoms with the assistance of a dehydrating catalyst at a temperature of about 100° to 300° F., subjecting the reaction mixture to fire and steam distillation up to about 600° F. to obtain the desired condensation product as distillation residue and recovering said distillation residue.

EUGENE LIEBER.